(12) United States Patent
Dowling et al.

(10) Patent No.: US 10,733,169 B2
(45) Date of Patent: Aug. 4, 2020

(54) INTERACTIVE USER INTERFACE FOR REFRESHABLE OBJECTS IN SHARED DOCUMENTS

(71) Applicant: Microsoft Technology Licensing, LLC, Redmond, WA (US)

(72) Inventors: Caoimhe Grace Dowling, Bellevue, WA (US); Tien Bui, Seattle, WA (US); Annie Colonna, Seattle, WA (US); Carlos Augusto Otero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/990,126

(22) Filed: May 25, 2018

(65) Prior Publication Data
US 2019/0362002 A1 Nov. 28, 2019

(51) Int. Cl.
*G06F 16/23* (2019.01)
*G06F 16/176* (2019.01)
*G06F 40/18* (2020.01)

(52) U.S. Cl.
CPC ........ *G06F 16/2322* (2019.01); *G06F 16/176* (2019.01); *G06F 16/2358* (2019.01); *G06F 16/2379* (2019.01); *G06F 40/18* (2020.01)

(58) Field of Classification Search
CPC .. G06F 16/2322; G06F 16/176; G06F 17/246; G06F 40/18; G06F 40/197; G06F 40/166
See application file for complete search history.

(56) References Cited

U.S. PATENT DOCUMENTS

| | | | |
|---|---|---|---|
| 8,161,396 B2 | 4/2012 | Barber et al. | |
| 8,291,067 B2 | 10/2012 | Veeramachaneni et al. | |
| 8,812,625 B1 | 8/2014 | Chitilian et al. | |
| 9,621,958 B2 | 4/2017 | Pegg et al. | |
| 9,852,120 B2 | 12/2017 | Rochelle et al. | |
| 2001/0055017 A1* | 12/2001 | Ording | G06F 3/0481 345/440 |
| 2005/0108623 A1 | 5/2005 | Bedford et al. | |
| 2007/0033597 A1 | 2/2007 | Mukundan et al. | |
| 2010/0205520 A1 | 8/2010 | Parish et al. | |
| 2012/0198383 A1* | 8/2012 | Cisler | G06F 3/0481 715/781 |
| 2013/0185651 A1 | 7/2013 | Wionzek et al. | |

(Continued)

OTHER PUBLICATIONS

"Features—Zoho Sheet", Retrieved From https://web.archive.org/web/20160113030214/https:/sheet.zoho.com/sheet/features, Jan. 13, 2016, 68 Pages.

(Continued)

*Primary Examiner* — Roland J Casillas (57) ABSTRACT

In non-limiting examples of the present disclosure, systems, methods and devices for indicating a refresh activity that affects an object in a shared document are presented. A first instance of a shared document may be displayed on a computing device of a first user. A second instance of the shared document may be displayed on a computing device of a second user, wherein the first and second users are concurrently active in the shared document. An indication that the second user has initiated a refresh of underlying data affecting an object displayed in the first instance of the shared document may be received from the second instance of the shared document. An indication of the initiated refresh may be displayed in the first instance of the shared document.

19 Claims, 9 Drawing Sheets

(56) References Cited

U.S. PATENT DOCUMENTS

| | | | |
|---|---|---|---|
| 2014/0082666 A1* | 3/2014 | Bloch | G11B 27/34 |
| | | | 725/37 |
| 2014/0372852 A1* | 12/2014 | Rothschiller | G06F 17/246 |
| | | | 715/212 |
| 2014/0372855 A1 | 12/2014 | Myerscough et al. | |
| 2015/0288756 A1* | 10/2015 | Larabie-Belanger | |
| | | | G06F 16/176 |
| | | | 715/753 |
| 2016/0378737 A1 | 12/2016 | Keslin et al. | |
| 2017/0052649 A1 | 2/2017 | Alcorn et al. | |

OTHER PUBLICATIONS

"Linking and Publishing Your Spreadsheets_Wdesk—Help", Retrieved From https://success.workiva.com/help/spreadsheets/linking-and-publishing-your-spreadsheets, Retrieved on: Apr. 4, 2018, 2 Pages.

Garun, Natt, "Excel for Windows now supports real-time multi-author editing", Retrieved From https://www.theverge.com/2017/3/28/15094930/microsoft-office-excel-windows-coauthor-editing-real-time-collaboration, Mar. 28, 2017, 3 Pages.

Gralla, Preston, "Flow to use Excel's new live collaboration features", Retrieved From https://www.computerworld.com/article/3212262/office-software/how-to-use-excel-live-collaboration.html, Aug. 1, 2017, 12 Pages.

"OLAP Spreadsheet Add-in User's Guide for Excel", Retrieved from: ftp://ftp.software.ibm.com/ps/products/db2olap/docs71/db2ep.pdf, Jun. 30, 2000, 232 Pages.

"International Search Report and Written Opinion Issued in PCT Application No. PCT/US19/032079", dated Aug. 21, 2019, 13 Pages.

* cited by examiner

INTERACTIVE USER INTERFACE FOR REFRESHABLE OBJECTS IN SHARED DOCUMENTS

BACKGROUND

The trend of moving information that was traditionally stored on personal computers to the cloud has made shared document editing commonplace. Various applications and application suites allow multiple users to co-author, edit, and review cloud-based shared documents simultaneously. The types of documents that can be modified and reviewed simultaneously include word processing documents, spreadsheet documents, presentation documents, and note taking documents, among others. Although there are many benefits to shared documents, it is difficult for a modifying and/or reviewing user of a shared document to identify the location of other active users in the shared document, determine what activities (e.g., editing, reviewing, refreshing) the other active users are performing on the shared document and/or on data sets that affect objects in the shared document, and/or quickly initiate real-time communications with the other active users without having to navigate away from the shared document and/or open a new application.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing an indication of refresh activities initiated by refreshing users that affect objects in shared documents that are being concurrently displayed on a device of a concurrently active viewing user. Tables, graphs, charts and cells in shared documents often reflect information that has been summarized from other data sets and/or results of one or more operations/functions applied to data from other data sets. According to examples described herein, when two users are concurrently active in a shared document, and one of the concurrently active users refreshes underlying data that affects one or more objects in the shared document, an display indication may be provided in the shared document user interface of the other concurrently active user that indicates that the refreshing user has initiated a refresh of the underlying data.

For example, if a concurrently active refreshing user has initiated a refresh of a data set that affects a pivot table or a pivot chart in shared document that a viewing user is concurrently active in, a shared document service hosting the shared document may cause display elements that indicate that underlying data affecting the pivot table or pivot chart is being refreshed to be displayed on the shared document user interface of the concurrently active viewing user. In some examples, the concurrently active viewing user may interact with an object that is affected by a refresh that has been initiated, and based on that interaction, a shared document service may cause a refresh contact card that includes an indication of the identity of the refreshing user, an estimated duration of time to complete the refresh, a time that the underlying data for the object was last updated, and/or interactive user interface elements for initiating real-time electronic communications between the viewing user and the refreshing user to be displayed in proximity to the interacted with object.

BRIEF DESCRIPTION OF THE DRAWINGS

Non-limiting and non-exhaustive examples are described with reference to the following figures.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for indicating a refresh activity that affects an object in a shared document. As used herein, a "shared document" describes a document that can be accessed, reviewed, and edited by two or more users from two or more devices. A shared document may be stored in the cloud in association with a shared document service that provides access to the shared document based on authorization credentials of users. As used herein, an "object" of a shared document may comprise one or more cells, one or more columns, one or more rows, one or more tables, one or more pivot tables, one or more graphs, and/or one or more charts. The shared documents described herein may include word processing documents, spreadsheet documents, presentation documents, and note taking documents, among others.

An object in a shared document may be affected by underlying data that feeds into the object. For example, pivot table objects and pivot chart objects may be affected by slicers that feed data into those objects, queries that feed data into those objects, and/or underlying data sets on which one or more functions are applied with the results being reflected in the pivot table objects and/or pivot chart objects. Examples described herein provide systems, methods, and devices for indicating to a user that is viewing a shared document, that another user that is concurrently active in the shared document has initiated a refresh of underlying data that affects one or more objects in the shared document. In some examples, the underlying data that is being refreshed and that affects the one or more objects may be stored or otherwise included in the same shared document as the one or more objects, in a different sheet of a workbook that contains the same shared document, on a website, and/or in a remote database (e.g., a shared document service database, in a SQL database).

According to some examples, the indication that another concurrently active user in a document has initiated a refresh of data that affects one or more objects being viewed by a viewing user of a shared document may comprise one or more of: a highlighting of the one or more affected objects, an outlining of the one or more affected objects, a colored overlay of the one or more affected objects, and/or a patterned overlay of the one or more affected objects. In some examples, the viewing user may interact with the one or more affected objects (e.g., hover a cursor over, click on, touch on a touch-sensitive display), and upon receiving the interaction, a refresh contact card that identifies the user that initiated the refresh of the affected one or more objects may be caused to be displayed in proximity to the object that the first user interacted with. In some examples, the contact card may include user interface elements for automatically initiating real-time communications and/or email communications with the user that initiated the refresh of the underlying data affecting the one or more objects. In additional examples, the contact card may include an activity status for the user that initiated the refresh (e.g., active, idle, away, in a meeting), such that the viewing user may more intelligently determine whether initiating a real-time electronic communication or sending an email to the refreshing user is most prudent should the viewing user wish to contact the refreshing user.

Technical advantages of the systems, methods and devices described herein for indicating a refresh activity that affects an object in a shared document include reduced processing costs (i.e., CPU cycles) due to the decrease in modifications made to objects in shared documents that are currently being affected by the initiation of a refresh to underlying data sets that affect those objects. For example, if a first user opens a shared document and that shared document is concurrently opened by a second user, and the second user has initiated a refresh that affects an object that the first user would like to work on, the first user can work on other aspects of the document, or another task, while the refresh is taking place, thereby decreasing the possibility that the first user's work be applied to outdated data. Another technical advantage of the systems, methods and devices described herein is the ability to initiate real-time communications amongst concurrent users of a shared document via communication elements in a refresh contact card that is surfaced in proximity to an object for which a timed refresh has been initiated. The ability to initiate real-time communications via those elements allows users to automatically open messaging applications that would otherwise have to be manually opened and/or search a contacts application to identify contact information for a concurrent user that a user would like to initiate a real-time communication with. In some examples, the communication elements in the refresh contact cards may automatically initiate real-time electronic communications between concurrent users of a shared document from an already open user interface for that document, thereby providing a better user experience in which users do not have to break their document workflow in the shared document to communicate with one another.

Figure 1:
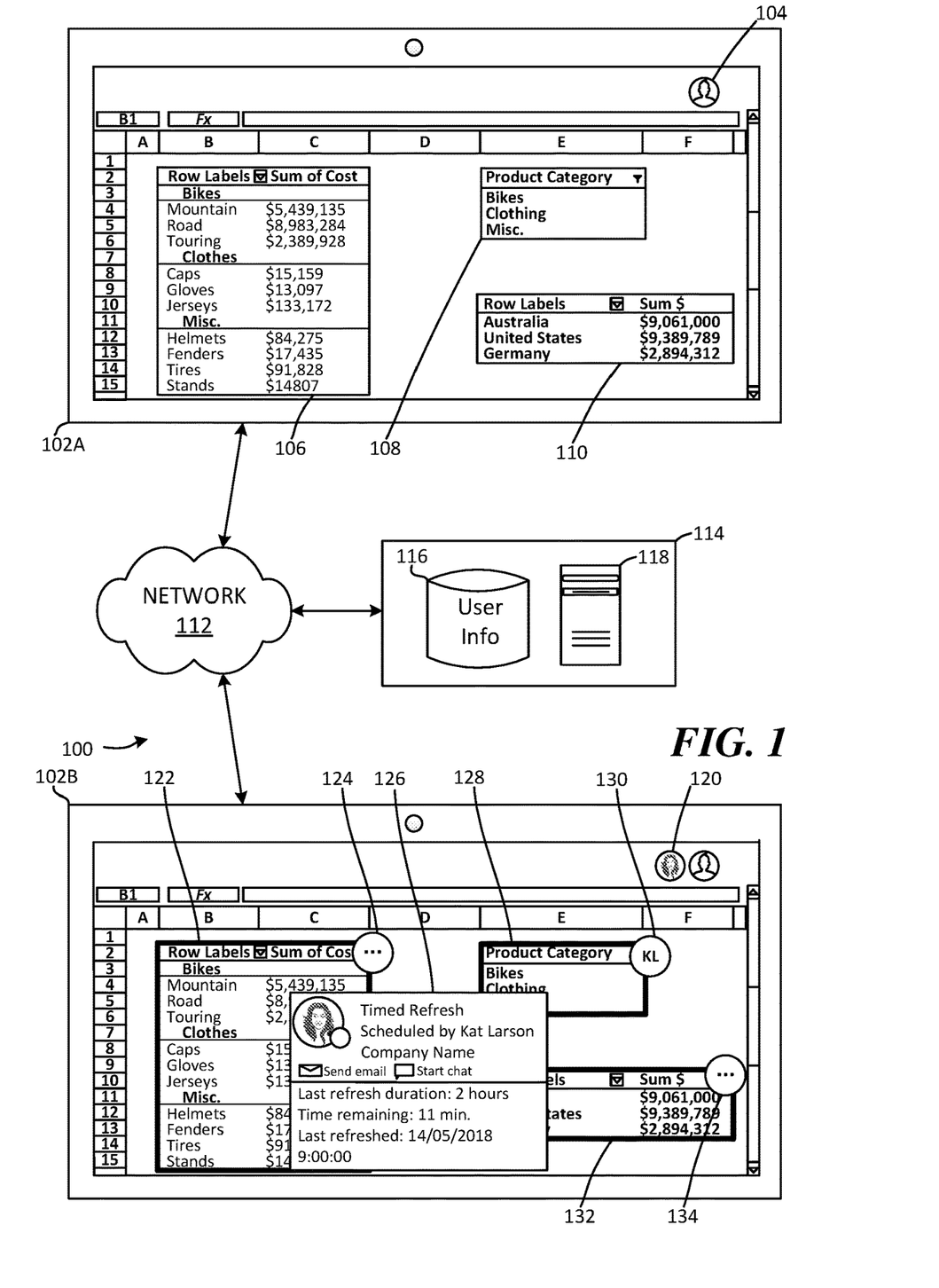
FIG. 1 is a schematic diagram illustrating an example distributed computing environment for indicating, in a first instance of a shared document, a refresh activity performed in a second instance of the shared document that affects one or more objects in the shared document.

FIG. 1 is a schematic diagram illustrating an example distributed computing environment 100 for indicating, in a first instance of a shared document, a refresh activity performed in a second instance of the shared document that affects one or more objects in the shared document. Distributed computing environment 100 includes computing device 102A, which displays a shared spreadsheet document accessed by first user 104, computing device 102B (which is the same computing device as computing device 102A), which displays the same shared spreadsheet document accessed by first user 104 after second user 120 initiates a refresh action in the shared spreadsheet document. Distributed computing environment also includes network and processing sub-environment 114, components of which are sometimes referred to herein as a "shared document service", which includes user info 116, and server computing device 118. Any of the computing devices shown in distributed computing environment 100 may communicate with one another, and with external databases, via network 112.

The shared spreadsheet document displayed on computing device 102A includes table 106, which includes product categories "bikes," "clothing, and "misc.," which are sales categories for a bicycle shop that created the shared spreadsheet document; table 106, which includes costs for individual items under the categories "bikes," "clothing," and "misc.,"; and table 110, which includes total costs for the bicycle company in the countries of Australia, United States, and Germany. In some examples, one or more of the tables in the shared spreadsheet document may be pivot tables that pull and/or otherwise summarize data from other objects in the same shared spreadsheet document, an external database, a website, and/or a separate spreadsheet document or sheet.

The shared spreadsheet document may be stored in one or more storage devices associated with network and processing sub-environment 114. For example, a shared document service comprised in network and processing sub-environment may include a shared document store that may contain one or more shared documents which may be accessible to users via network 112 according to relevant sharing permission associated with each document. Server computing device 118 may perform one or more operations associated with indicating refresh actions that affect objects in shared documents, and assisting with electronic communications associated with users of shared documents.

In the illustrated example, second user 120 has accessed the shared spreadsheet document from a second computing device while first user 104 concurrently accesses the shared spreadsheet document. The concurrent access of the shared spreadsheet document by second user 120 is indicated to first user 104 in part by the user interface element in the upper right corner of the display of computing device 102B, which depicts images of two concurrent users of the shared spreadsheet document. Second user 120 is indicated on the display of the spreadsheet user interface displayed on computing device 102B (e.g., the computing device of first user 104) as being currently active in or otherwise located in shared document object 128 (i.e., the product category table) of the shared spreadsheet document. The indication that second user 120 is currently active in or otherwise located in shared document object 128 comprises user interface element 130 which is an icon proximate to shared document object 128 that has second user 120's initials displayed therein (i.e., "KL" for "Kat Larson").

Second user 120 has initiated a refresh action on shared document object 128 that affects shared document object 122 (i.e., costs for individual items under the categories "bikes," "clothing," and "misc.,") and shared document object 132 (i.e., total costs for the bicycle company in the countries of Australia, United States, and Germany). In some examples, the refresh action may affect shared document objects 122 and 132 because one or more product categories and their associated costs may have been added or removed from the list of product categories included in table 108 since the last refresh action. In other examples, the refresh action may affect shared document objects 122 and 132 because costs associated with one or more items for existing categories included in table 108 may have been added, removed and/or modified since the last refresh action. The underlying product, item, and cost data may be included in datasets stored in the same shared spreadsheet document or sheet, a different spreadsheet document or sheet, and/or an external data source (e.g., a website, a SQL database).

An indication related to each object in the shared spreadsheet document that is affected by the refresh action initiated by second user 120 is caused to be displayed proximate to the affected objects. In this example, user interface element 124, which comprises three consecutive, and in some examples moving, dots, indicates that shared document object 122 is affected by the refresh action initiated by second user 120. Similarly, user interface element 134, which also comprises three consecutive, and in some examples moving, dots, indicates that shared document object 132 is affected by the refresh action initiated by second user 120.

In addition to user interface elements 124 and 134 indicating shared document objects 122 and 132, respectively, are affected by the refresh action initiated by user 120, a duration of time that the refresh is estimated to complete, a time that the refresh last occurred, a duration of time that a last refresh took to complete, information about the user that initiated the current refresh, and/or selectable user interface elements for initiating electronic messages between first user 104 and the user that initiated the refresh (i.e., second user 120) may also be caused to be displayed in proximity to one or more objects that are affected by the refresh. In this example, this additional information is encompassed in refresh contact card 126, although one or more elements included in refresh contact card 126 may be displayed in separate user interface elements in the spreadsheet application.

In some examples, refresh contact card 126 may be caused to be displayed on first user's 104 spreadsheet application user interface upon second user 120 initiating a refresh that affects one or more objects in the shared spreadsheet document that first user 104 is concurrently active in, first user 104 hovering a cursor over one or more objects that the timed refresh affects, first user 104 clicking on one or more objects that the timed refresh affects, first user 104 clicking or hovering over one or more of user interface elements 124 and/or 134, and or user 104 providing a verbal indication, or touch indication to a touch sensitive display of computing device 102B, to surface refresh contact card 126. An additional description of the elements that may be displayed in proximity to objects in a shared document that may be affected by a timed refresh is included in the description of FIG. 3.

Figure 2:
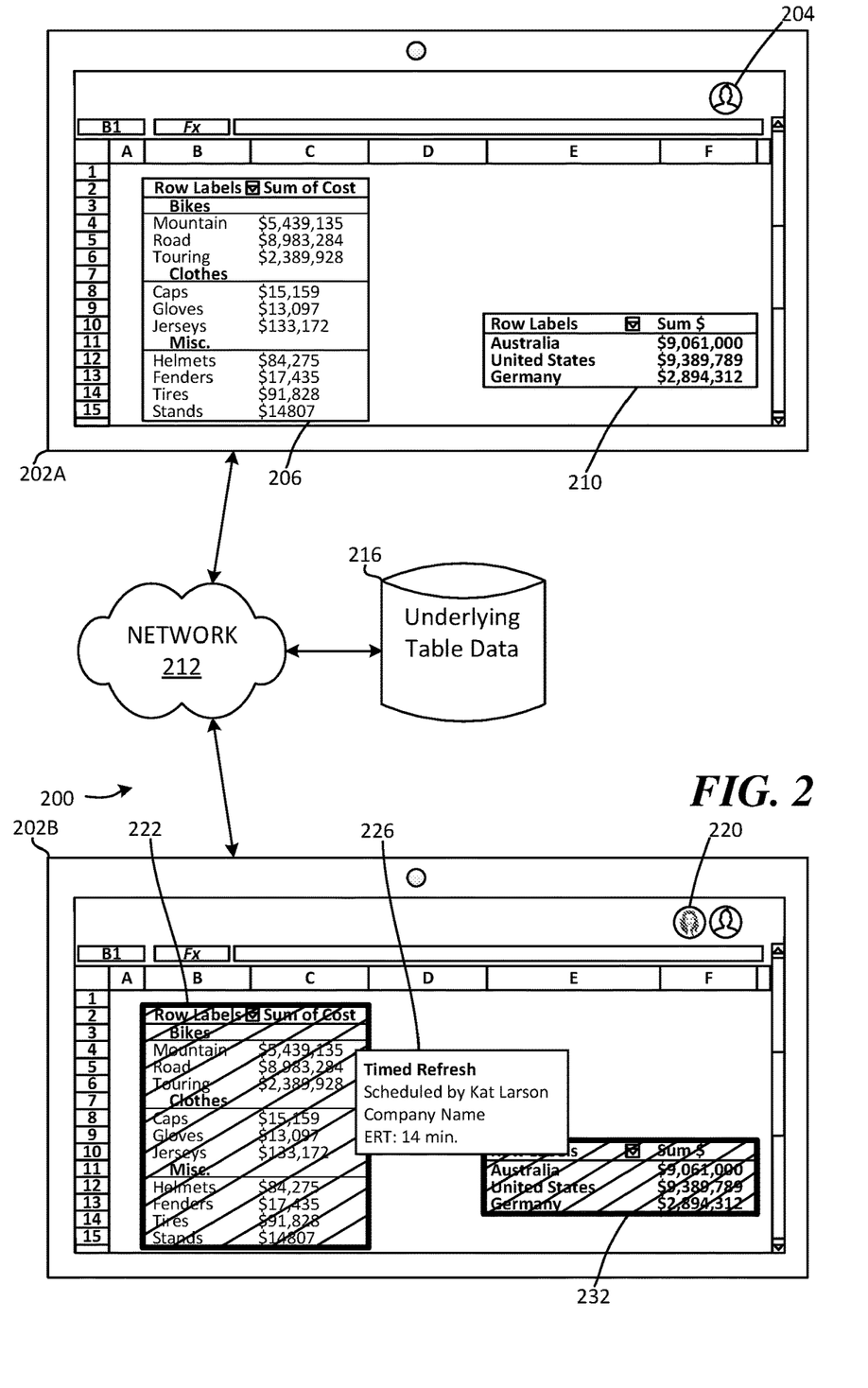
FIG. 2 is a schematic diagram illustrating an example distributed computing environment for indicating, in a first instance of a shared document, a refresh activity performed in a second instance of the shared document that affects one or more objects in the shared document, where the refreshed data is stored in a database separate from the shared document.

FIG. 2 is a schematic diagram illustrating an example distributed computing environment 200 for indicating, in a first instance of a shared document, a refresh activity performed in a second instance of the shared document that affects one or more objects in the shared document, where the refreshed data is stored in a database separate from the shared document. Distributed computing environment 200 includes computing device 102A, which displays a shared spreadsheet document accessed by first user 204, and computing device 102B (which is the same computing device as computing device 102A), which displays the same shared spreadsheet document accessed by first user 104 after second user 220 initiates a refresh action that affects one or more objects in the shared spreadsheet application. Distributed computing environment 200 also includes network 212, which any of the devices shown or associated with distributed computing environment 200 may utilize to communicate with one another, and underlying table data storage 216. Underlying table data storage 216 is a database that is separate from the shared document service, and includes the underlying data that causes the one or more objects in the shared spreadsheet document to be affected by a refresh initiated by second user 220.

The shared spreadsheet document displayed on computing device 202A includes table 206, which includes product categories "bikes," "clothing," and "misc.," which are sales categories for a bicycle shop that created the shared spreadsheet document; and table 210, which includes total costs for the bicycle company in the countries of Australia, United States, and Germany for the products. Table 206 and table 210 are both tables that summarize data stored remotely on underlying table data storage 216. For example, the underlying data in underlying table data storage 216 may include individual purchases (i.e., costs) of each item, for each product category. Table 206 may include the sum of each of those purchases for each product category, and table 210 may include the sum of each of those purchases for each of countries Australia, United States, and Germany.

The shared spreadsheet document user interface depicted on computing device 202B, is the same user interface depicted on computing device 202A (i.e., user 204's shared spreadsheet document user interface), but second user 220 has concurrently accessed the shared spreadsheet document and initiated a timed refresh of table 222 (table 206 on computing device 202A), and table 232 (table 210 on computing device 202A). In some examples, second user 220 may have initiated the timed refresh by interacting with one or both of tables 222 and 232, with the underlying data for those tables originating in underlying table data 216. In other examples, second user 220 may have initiated the timed refresh by interacting with a separate object of a shared spreadsheet workbook that the shared spreadsheet document is part of.

There are a plurality of visual elements of the shared spreadsheet document user interface displayed on computing device 202B that indicate that a timed refresh that affects objects in the shared spreadsheet document has been initiated. Specifically, both of tables 222 and 232 have been highlighted, and a bold outline is now displayed around both of tables 222 and 232 to indicate that a timed refresh has been initiated that affects data in both of those tables. The illustrated indicators are just examples of indicators that can be utilized by the systems, methods and devices described herein to indicate that a timed refresh has been initiated by a concurrently active user in a shared document that affects one or more objects. Other examples include shading the one or more objects, applying a pattern to the one or more object, and displaying an indicator icon proximate to the one or more objects, as well as combinations of the same.

In addition to indicating that both of tables 222 and 232 are affected by a timed refresh that has been initiated by second user 220, user interface element 226 may also be caused to be displayed by the shared document service. User interface element 226 is displayed proximate to both of tables 222 and 232. However, in some examples, user interface element 226 may only be caused to be displayed proximate an object that is affected by a timed refresh, which first user 204 has interacted with (e.g., hovered a cursor over, clicked on, touched on a touch-sensitive display). User interface element 226 includes text that indicates that a timed refresh has been initiated by a concurrent user of the shared document, the name of the concurrent user that initiated the timed refresh (i.e., Kat Larson), an entity name associated with the user that initiated the timed refresh (i.e., Company Name), and an estimated refresh time to complete the timed refresh (i.e., 14 minutes). In some examples, one or more of the elements in user interface element 226 may not be present. In additional examples, one or more additional elements may be included in user interface element 226. For example, user interface element 226 may include an activity status in the shared document (e.g., active, idle, away, in a conference call) for the user that initiated the timed refresh affecting tables 222 and 232 and/or a time and/or date that those objects were last updated based on a refresh of their underlying data.

Figure 3:
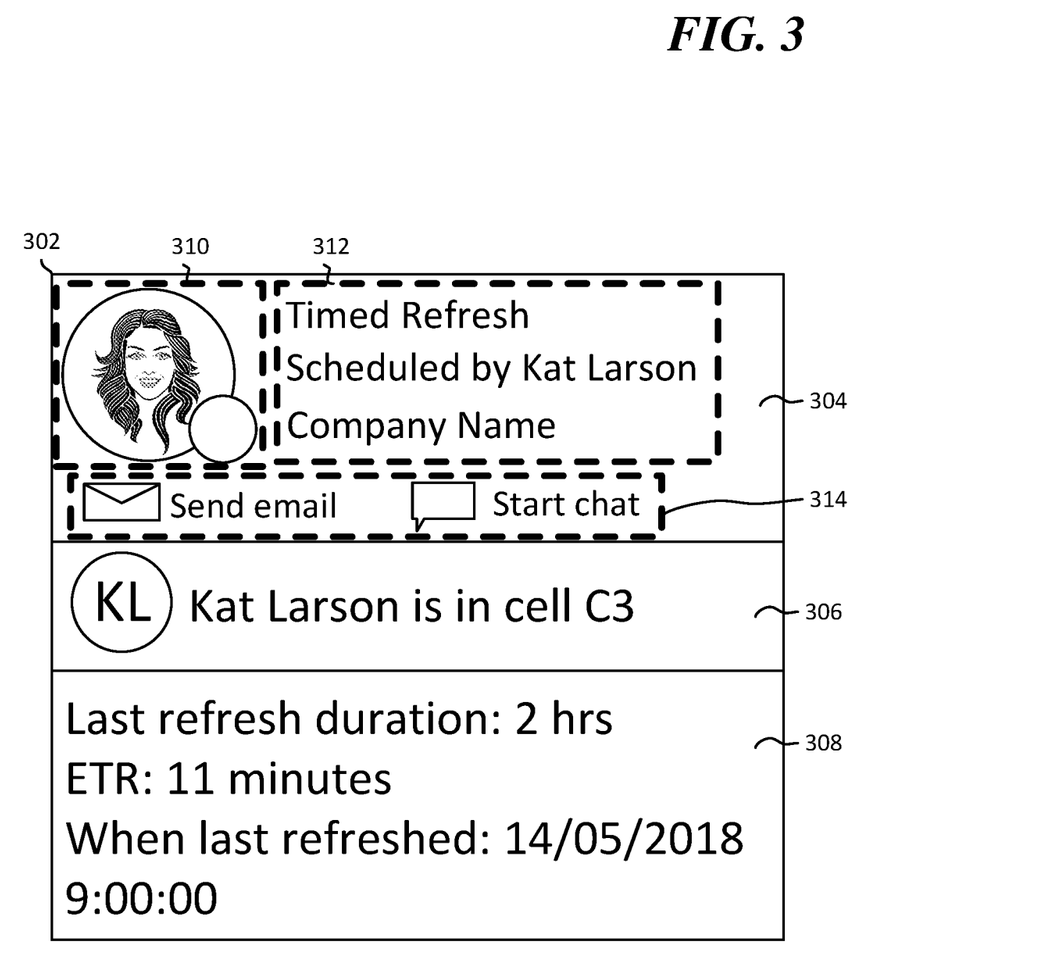
FIG. 3 illustrates exemplary user interface elements for displaying information about concurrent shared document users that initiate refresh actions associated with the shared documents, and initiating electronic messaging communications with the concurrent shared document users.

FIG. 3 illustrates exemplary user interface elements for displaying information about concurrent shared document users that initiate refresh actions associated with the shared documents, and initiating electronic messaging communications with the concurrent shared document users. The user interface elements are comprised in contact card 302. However, in some examples one or more of the illustrated user interface elements may be independent from contact card 302.

Contact card 302 includes first contact portion 304, second contact portion 306, and third contact portion 308. First contact portion 304 includes user icon 310 and an overlapping activity status icon. The user icon 310 is an image associated with a user account corresponding to contact card 302. The activity status icon provides an indication of the current activity status of the user associated with the contact card 302 in a concurrently shared document with the viewing user. In some examples, the activity status icon may be colored to reflect a current activity status of the user in the shared document. For example, a first color activity status may indicate that the user has recently performed an action and/or navigated in the shared document, a second color activity status may indicate that the user has been idle in the shared document for some amount of time, and a third color activity status may indicate that the user is currently editing the shared document. In other examples, the activity status icon may have text associated with it that reflects a current activity status of the user in the shared document.

First contact portion 304 also includes an indication that the specific concurrently active user corresponding to contact card 302 initiated a timed refresh (e.g., text stating "timed refresh"), and contact information 312 about the concurrently active user corresponding to the contact card. In this example, contact information 312 includes the concurrently active user's first and last name and company name. More or less information may be included in contact information 312. For example, contact information 312 may include a location of the concurrently active user, a school associated with the concurrently active user, and/or an indication of how the concurrently active user is connected to the viewing user.

First contact portion 304 also includes selectable user interface elements 314 for initiating an electronic communication between the viewing user and the user corresponding to the contact card (i.e., Kat Larson). By selecting the "start chat" icon, the viewing user may initiate a real-time text-based, voice-based, and/or video-based communication with the user corresponding to the contact card. By selecting the "send email" icon, the viewing user may initiate an email to the user corresponding to the contact card. In some examples, initiating the email via the "send email" icon may pre-populate the "To" field with the user's email address that corresponds to the contact card.

In some examples, the real-time communication initiated by the selection of the "start chat" icon may cause a messaging window for communicating with the user corresponding to the contact card to be surfaced in the shared document. In other examples, the real-time communication initiated by the selection of the "start chat" icon may cause a messaging application to be automatically opened, and in some examples, prepopulated with contact information for messaging the user corresponding to the contact card. In either case, the viewing user's workflow in the shared document is not interrupted to locate a messaging application, start a messaging application, or enter contact information for messaging the user corresponding to the contact card, thereby enhancing the user experience. Additionally, rather than having to open a contacts application to locate the user's contact information that the viewing user would like to message, by selecting the "start chat" icon that contact information can be automatically identified and populated in the relevant "to" field in the electronic communication. By eliminating the need to open a separate contacts application, and perform a search of that contacts application for relevant contact information, the number of computer processing cycles needed to initiate an electronic communication between co-authoring users of the shared document is reduced. Storage costs associated with a contacts application may also be reduced due to the non-necessity of each user having relevant contact information stored on their personal devices. Instead, a central contact repository may be maintained and accessed for presenting contact information about users of a shared document and initiating electronic messages amongst users of a shared document.

Second contact portion 306 provides a displayed indication of an object that the user corresponding to the contact card (i.e., Kat Larson) has currently selected. In this example, the displayed indication indicates that Kat Larson is in, or has currently selected, cell object C3. In examples where a co-authoring user has contemporaneously selected more than one object, second contact portion 306 may indicate each contemporaneously selected object. For example, if Kat Larson contemporaneously selected cell object C3 and a graph in the shared document, the contemporaneous selection of both objects may be indicated in second contact portion 306.

Third contact portion 308 includes a duration of time that the last refresh corresponding to the one or more objects relating to contact card 302 took to refresh (e.g., 2 hours), an estimated time remaining (ETR) in a currently active refresh corresponding to the one or more objects in contact card 302, and a date and time that the underlying information for the one or more objects relating to contact card 302 were last refreshed. In some examples, the estimated refresh time may be updated in near real-time such that as the refresh progresses, the displayed estimated time remaining goes down in near real-time.

Figure 4:
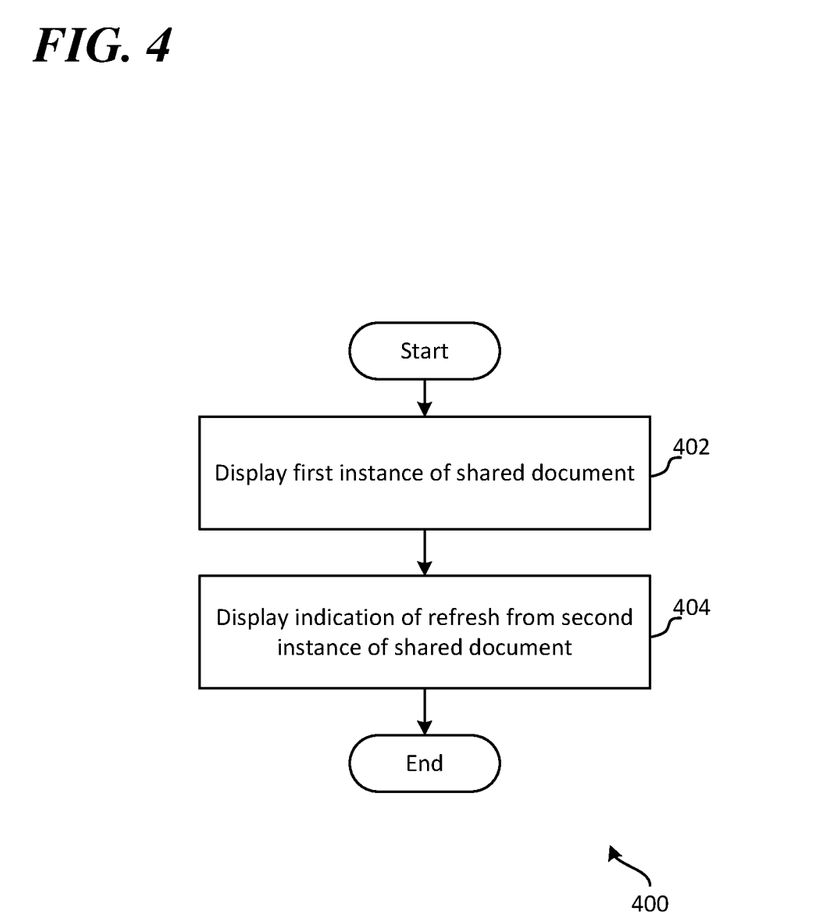
FIG. 4 is an exemplary method for indicating a refresh activity performed in a concurrently opened shared document.

FIG. 4 is an exemplary method 400 for indicating a refresh activity performed in a concurrently opened shared document. The method 400 begins at a start operation and flow continues to operation 402.

At operation 402 a first instance of a shared document is displayed. The first instance of the shared document is associated with a first user that is currently accessing the shared document. The shared document may be accessed by the first user via a cloud-based or local area network based shared document service that hosts documents for review and/or editing by a plurality of users. The shared document service may only grant the first user access to the shared document upon verifying credentials of the user and/or the user's device that the user is utilizing to access the shared document. In some examples, the shared document service may authenticate the first user for review permissions, edit permissions, and/or share permissions based on the first user's credentials.

From operation 402 flow continues to operation 404 where an indication that a second user has initiated a refresh of underlying data affecting an object displayed in the first instance of the shared document is displayed in the first instance of the shared document. In some examples, the second user may have initiated the refresh by interacting with one or more data sets that are included in the shared document, in a different sheet of a workbook that includes the shared document, in a different document, a website and/or remote storage, which feed into the one or more affected objects in the shared document. In other examples, the second user may have initiated the refresh by interacting with an element of the shared document that pulls underlying data from a remote location. Examples of the one or more objects that may be affected by the refresh initiated by the second user include pivot tables, pivot charts, and tables that are backed by queries. In examples, the second user that initiated the refresh of underlying data affecting the object is concurrently accessing the shared document with the first user from a second instance of the shared document, and when the indication is displayed in the first instance, the refresh has not yet been completed.

The indication that the second user has initiated a refresh of underlying data affecting an object displayed in the first instance may comprise one or more of a highlighting of the one or more affected objects, an outlining of the one or more affected objects, a colored overlay of the one or more affected objects, and/or a patterned overlay of the one or more affected objects. In some examples, the first user may interact with the one or more affected objects (e.g., hover a cursor over, click on, touch on a touch-sensitive display), and upon receiving the interaction, a refresh contact card that identifies the user that initiated the refresh of the affected one or more objects may be caused to be displayed in proximity to the object that the first user interacted with. In some examples, the contact card may include user interface elements for automatically initiating real-time communications and/or email communications with the user that initiated the refresh of the underlying data affecting the one or more objects. In additional examples, the contact card may include an activity status for the user that initiated the refresh, a time and/or date that the underlying data affecting the one or more objects was last updated/refreshed, and/or an estimated refresh time to complete the initiated refresh.

From operation 404 flow continues to an end operation and the method 400 ends.

Figure 5:
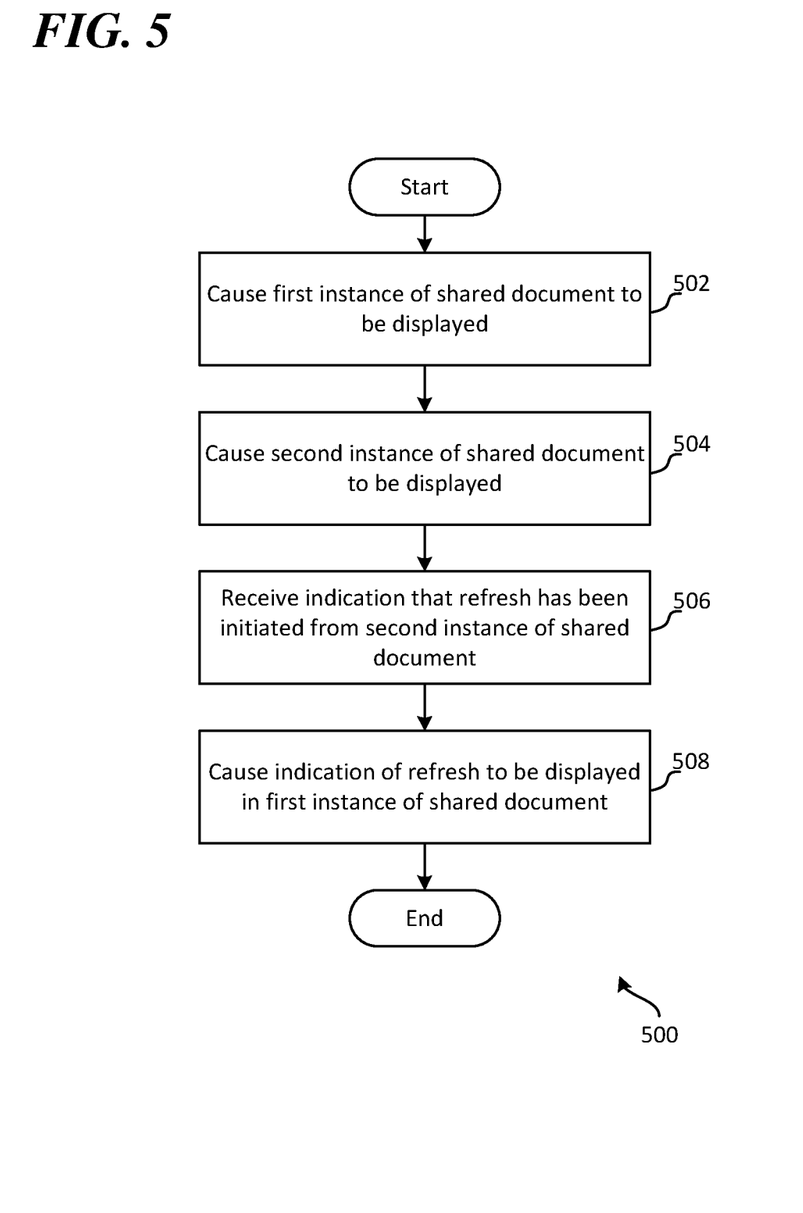
FIG. 5 is another exemplary method for indicating a refresh activity performed in a concurrently opened shared document.

FIG. 5 is another exemplary method 500 for indicating a refresh activity performed in a concurrently opened shared document. The method 500 begins at a start operation and flow moves to operation 502.

At operation 502 a first instance of a shared document is caused to be displayed on a computing device of a first user. The first instance of the shared document may correspond to a first user accessing a shared document service where the shared document is stored. The shared document service, and the shared document, may be accessed by a remote computing device of the first user via a network. That is, in some examples, the shared document service may be a cloud-based service. In other examples, the shared document service may be part of a local area network. In some examples, the first user may send a request to the shared document service with credentials that are validated for accessing the shared document service prior to the shared document service causing the shared document to be displayed and/or transferred to the first user's computing device for display.

From operation 502 flow continues to operation 504 where a second instance of the shared document is caused to be displayed on a computing device of a second user. The first and second users are concurrently active in the shared document. The second user may have accessed the shared document from the shared document service prior to or after the first user accessed the shared document. Like the first user, the second user may send a request to the shared document service with credentials that are validated for accessing the shared document prior to the shared document service causing the shared document to be displayed and/or transferred to the second user's computing device for display. In some examples, upon the second user accessing the shared document, the user interface for the first instance of the shared document (i.e., the first user's user interface) may display an icon or other display element that indicates that the second user is concurrently accessing the shared document.

From operation 504 flow continues to operation 506 where an indication that the second user has initiated a refresh of underlying data affecting an object displayed in the first instance of the shared document is received from the second instance of the shared document. In some examples the object that is affected by the refresh may be a pivot table and/or pivot chart, and/or table that is backed by a query, and the underlying data that has been refreshed may be data that feeds into the pivot table, a pivot chart, a slicer, and/or a query that is summarized into a table object. The underlying data may be stored in the shared document, in a different sheet of a workbook containing the shared document, in a different document, in a database included in the shared document service, on a website, and/or in a remote database.

From operation 506 flow continues to operation 508 where an indication of the initiated refresh is caused to be displayed in association with the object. In some examples the indication may comprise highlighting, bolding, outlining, coloring, and/or overlaying a pattern on, around, or in proximity to the one or more objects that are affected by the refresh. In other examples, a user may interact with one or more objects that are affected by a refresh (e.g., hover a cursor over, click on, touch on a touch-screen display) and upon receiving the interaction, the user's computing device and/or the shared document service may cause a refresh contact card to be displayed in proximity to the one or more objects that the user interacts with. The contact card may include a name of a user that initiated the refresh of the one or more objects, an estimated duration of time that the refresh is going to take to complete, a time that a refresh of the underlying data last occurred, an activity status of the user that initiated the refresh, and/or user interface elements for initiating real-time electronic communications between the viewing user and the concurrently active user that initiated the refresh. In some examples, a displayed estimated duration of time that the refresh is going to take to complete may include an estimation based on a historical average of durations of time that the underlying data was refreshed. In additional examples, a displayed estimated duration of time that the refresh is going to take to complete may include an estimation based on one or more refresh times for data sets that are similar (e.g., same size, same location, same type) to the underlying data based on analysis of one or more similar data sets by the shared document service. In some examples, when the refresh is caused to be displayed, the refresh has not yet been completed.

From operation 508 flow continues to an end operation and the method 500 ends.

Figure 6:
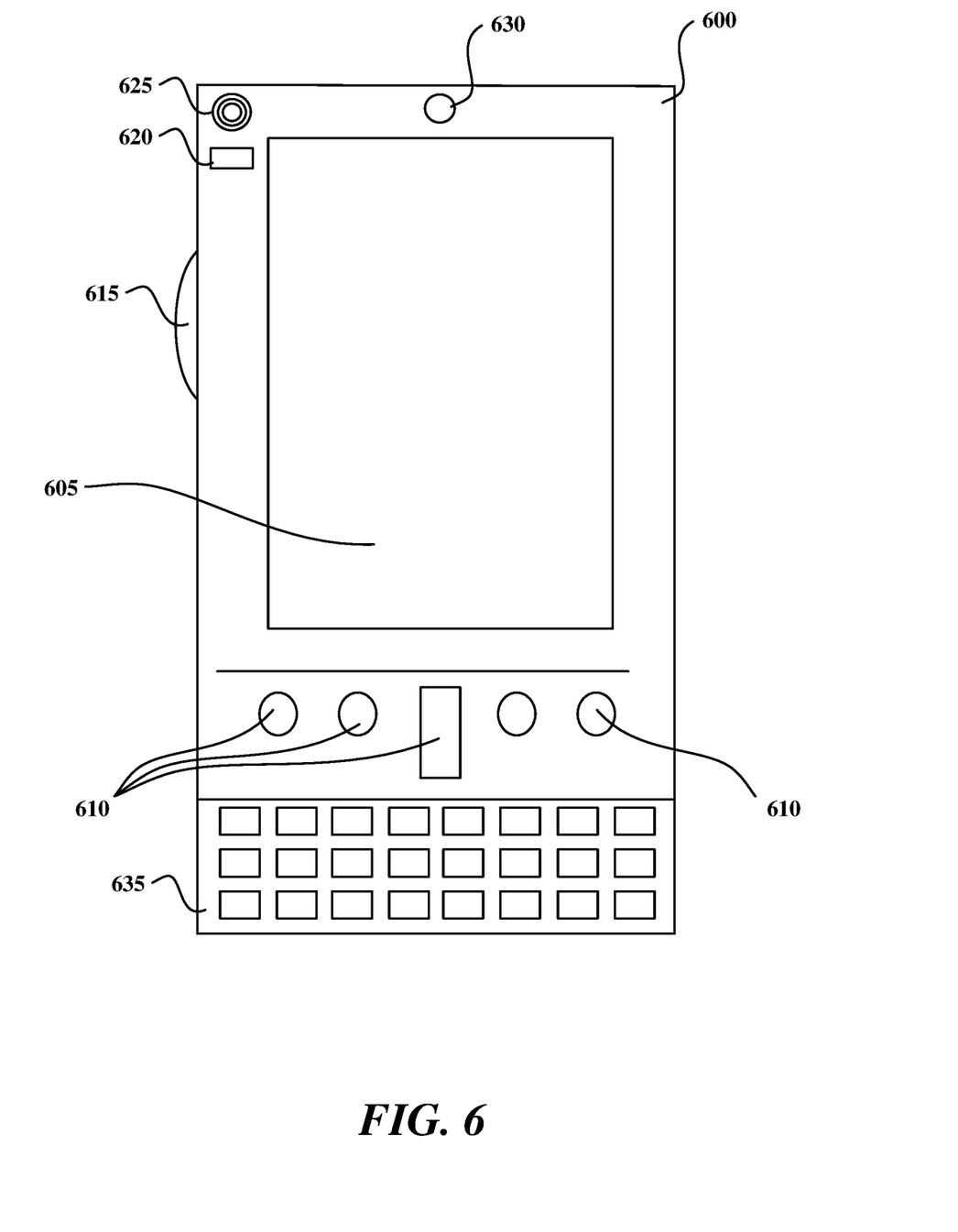
FIGS. 6 and 7 are simplified diagrams of a mobile computing device with which aspects of the disclosure may be practiced.
Figure 7:
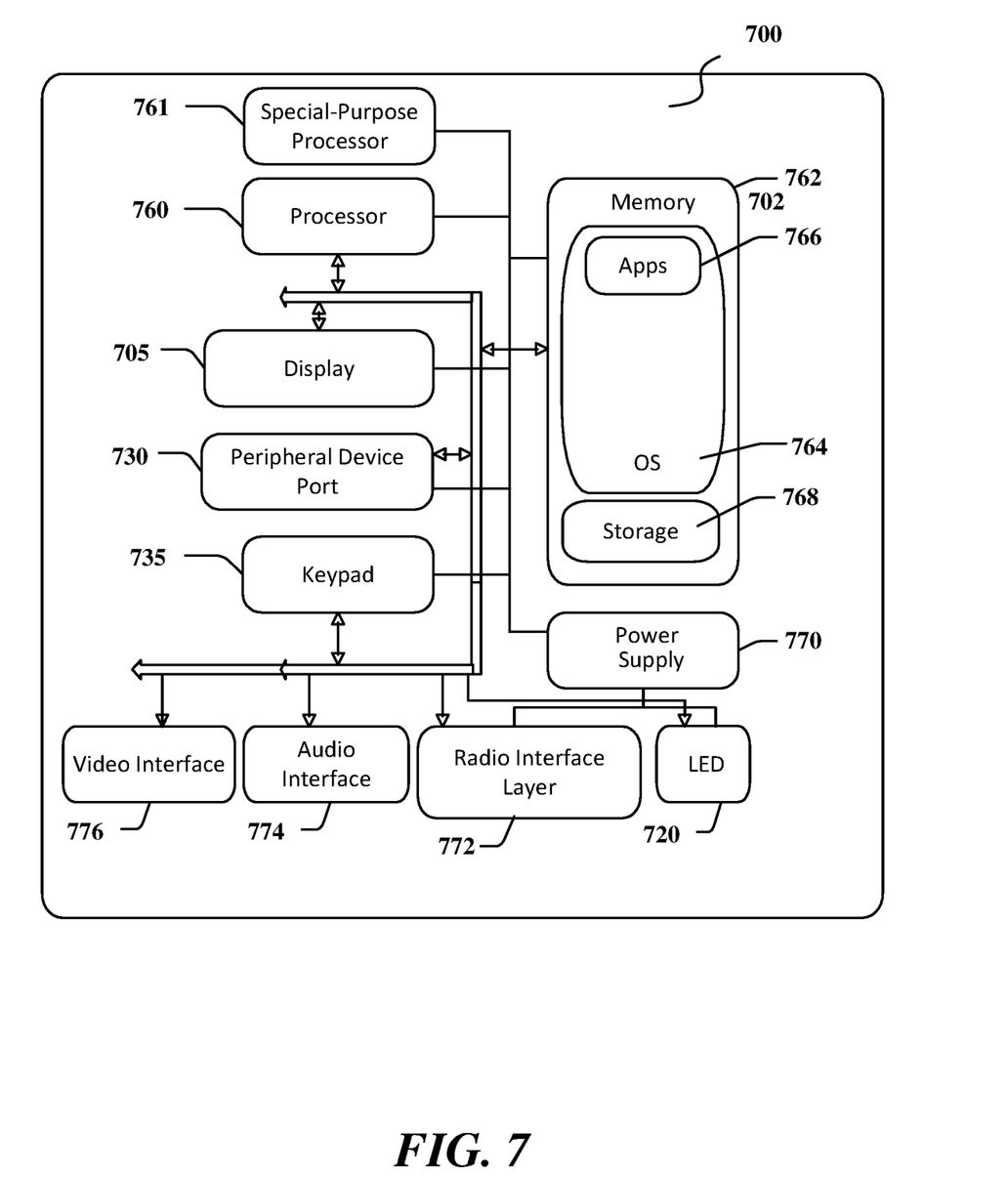

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
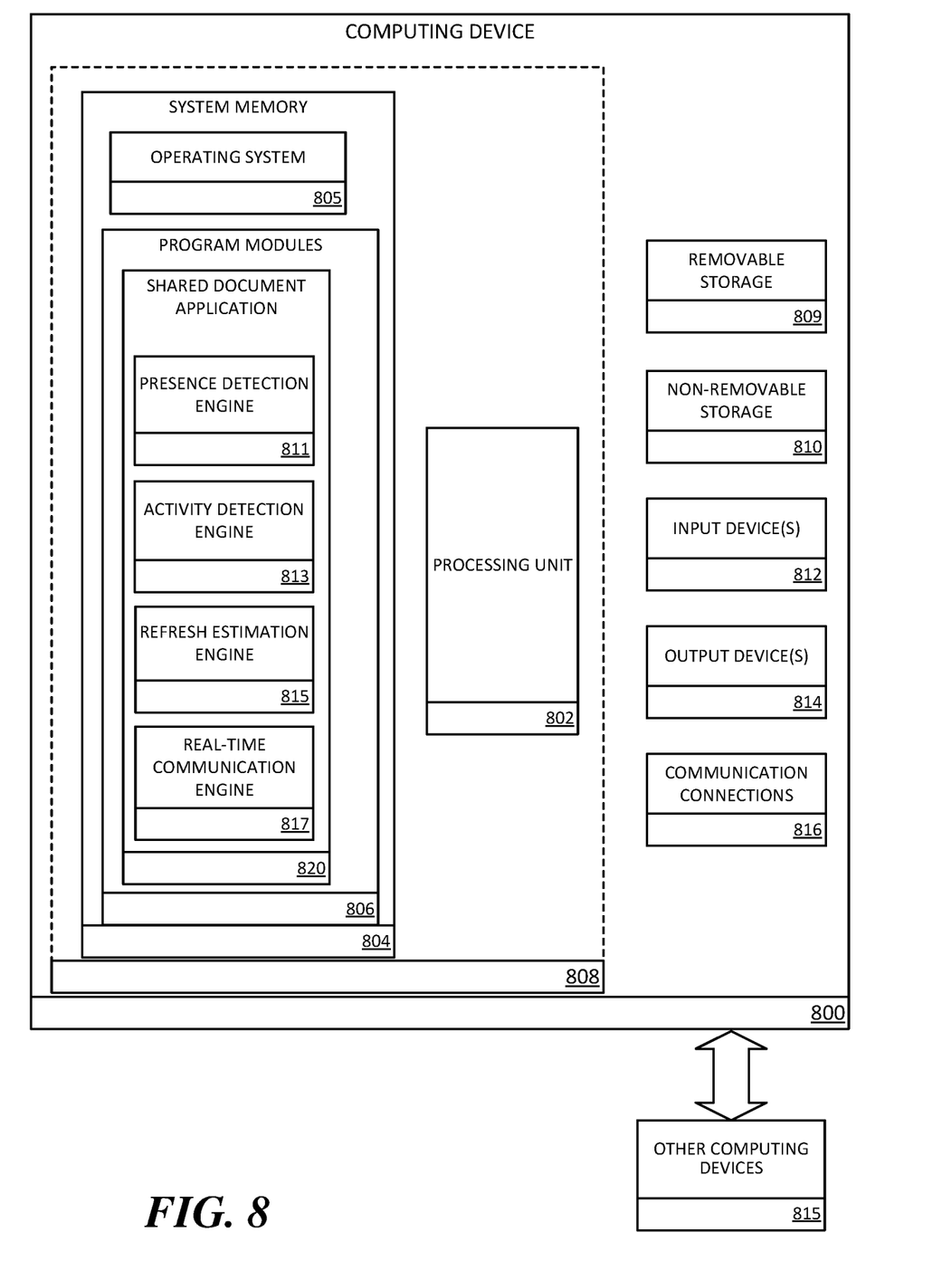
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with indicating a timed refresh that affects one or more objects in a shared document. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more shared document application programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., shared document application 820) may perform processes including, but not limited to, the aspects, as described herein. According to examples, the presence detection engine 811 may perform one or more operations associated with detecting one or more objects in a shared document that may be affected by a refresh of an underlying data set. The activity detection engine 813 may perform one or more operations associated with detecting an activity status associated with each concurrent user of a shared document. The refresh estimation engine 815 may perform one or more operations associated with calculating an estimated duration of time that an initiated data set refresh will take to complete. The real-time communication engine 817 may perform one or more operations associated with identifying contact information (e.g., a phone number, an email address, an instant messaging alias) for one or more shared users of a shared document, automatically opening a messaging window and/or messaging application for initiating an electronic message between a viewing user and one or more concurrent users of a shared document, and/or automatically populating a "to" field with one or more concurrent users' contact information in an associated messaging window and/or messaging application.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
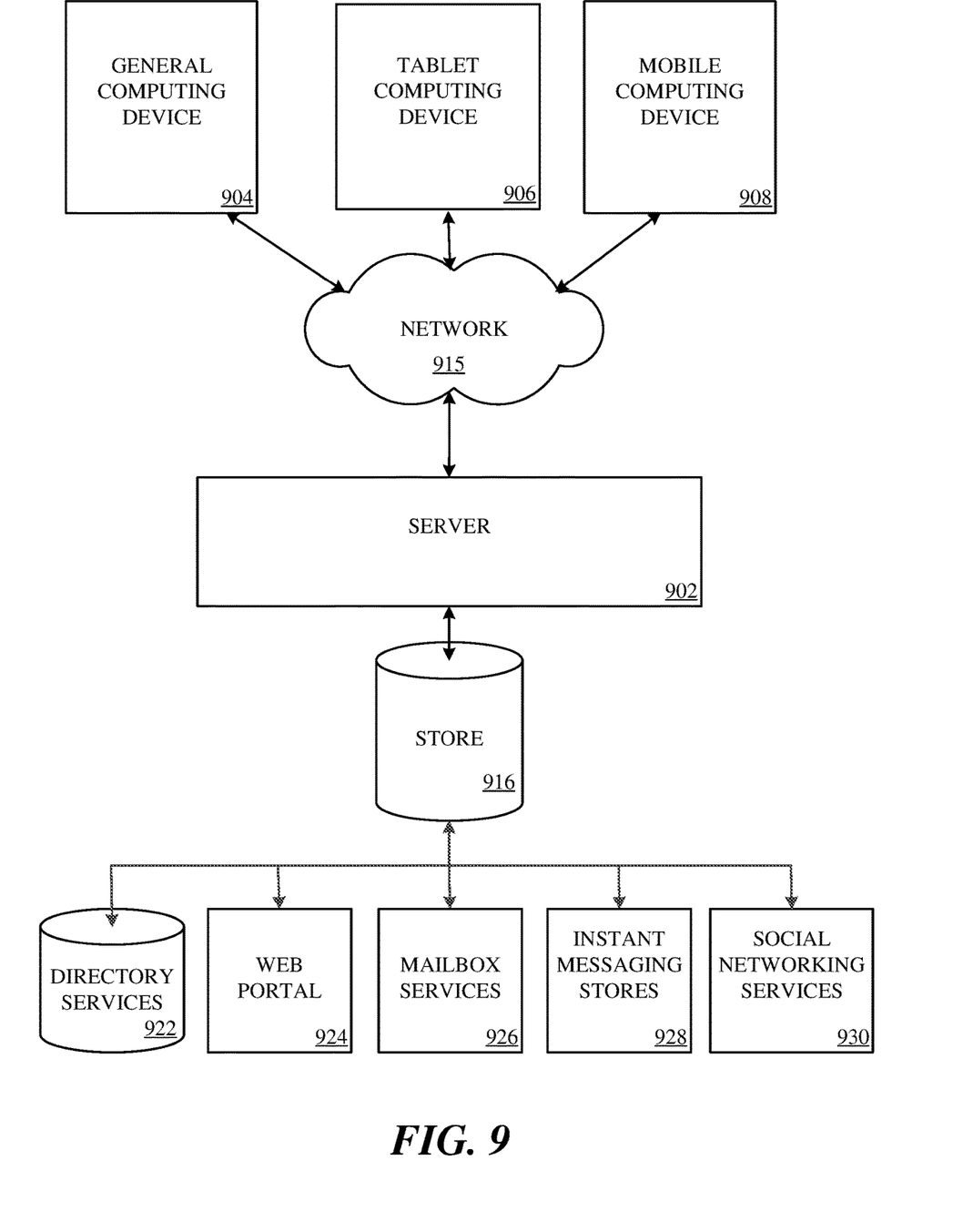
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A device-implemented method comprising:
causing display of an instance of a spreadsheet workbook comprising a plurality of spreadsheets, the instance is a version of the spreadsheet workbook associated with a first user; and
receiving a modification of an underlying data structure of a spreadsheet, of the plurality of spreadsheets, for the spreadsheet workbook by a second user, the underlying data structure being stored separately from the spreadsheet of the spreadsheet workbook;
initiating a refresh of the version of the spreadsheet workbook based on the receiving of the modification of the underlying data structure of the spreadsheet;
causing display, in the instance of the spreadsheet workbook, of a graphical notification of the refresh within the spreadsheet indicating that:
the refresh of the version of the spreadsheet workbook has initiated,
the second user initiated the refresh,
the refresh affects a first object of the spreadsheet, and
the refresh affects a second object of the spreadsheet.

2. The device-implemented method of claim 1 wherein the graphical notification comprises, as an indication that the second user initiated the refresh, an indication of an identity of the second user proximate to the first object and the second object.

3. The device-implemented method of claim 2, wherein the indication of the identity of the second user is in a contact card comprising one or more selectable user interface elements selectable for initiating a real-time communication with the second user.

4. The device-implemented method of claim 2, wherein the indication of the identity of the second user is in a contact card comprising an activity status of the second user in a second version of the spreadsheet workbook.

5. The device-implemented method of claim 1, wherein the graphical notification further comprises an estimated duration of time required to complete the refresh.

6. The device-implemented method of claim 1, wherein the underlying data structure is stored in a second spreadsheet of the spreadsheet workbook.

7. The device-implemented method of claim 1, wherein the underlying data structure is stored in an external database, as a separate document from the spreadsheet workbook.

8. The device-implemented method of claim 1, wherein the graphical notification comprises one or more of: a color, a pattern, an outline, a highlight, and a pop-up window, in association with one of the first object and the second object.

9. The device-implemented method of claim 1, wherein the causing display of the graphical notification causes one or more graphical notifications to be rendered in the spreadsheet at a first location associated with the first data object and a second location associated with the second data object.

10. A system comprising:
a memory for storing executable program code; and
one or more processors, functionally coupled to the memory, the one or more processors being responsive to computer-executable instructions contained in the program code and operative to:
cause display of an instance of a spreadsheet workbook comprising a plurality of spreadsheets, the instance is a version of the spreadsheet workbook associated with a first user;
receive a modification of an underlying data structure of a spreadsheet, of the plurality of spreadsheets, for the spreadsheet workbook by a second user, the underlying data structure being stored separately from the spreadsheet of the spreadsheet workbook;
initiate a refresh of the version of the spreadsheet workbook based on the receiving of the modification of the underlying data structure of the spreadsheet; and
cause display, in the instance of the spreadsheet workbook, of a graphical notification of the refresh within the spreadsheet indicating that:
the refresh of the version of the spreadsheet workbook has initiated,
the second user initiated the refresh,
the refresh affects a first data object of the spreadsheet, and
the refresh affects a second data object of the spreadsheet.

11. The system of claim 10, wherein the graphical notification comprises, as an indication that the second user initiated the refresh, an indication of an identity of the second user proximate to the first object and the second object.

12. The system of claim 10, wherein the graphical notification comprises an estimated duration of time required to complete the refresh.

13. The system of claim 10, wherein the underlying data structure is stored, in an external database, as a separate document from the spreadsheet workbook.

14. The system of claim 10, wherein the underlying data structure is stored in a second spreadsheet of the spreadsheet workbook.

15. The system of claim 10, wherein the causing display of the graphical notification causes one or more graphical notifications to be rendered in the spreadsheet at a first location associated with the first data object and a second location associated with the second data object.

16. A computer-readable storage device comprising executable instructions that, when executed by one or more processors, assists with indicating a refresh activity in a spreadsheet workbook, the computer-readable storage device including instructions executable by the one or more processors for:
causing display of an instance of the spreadsheet workbook comprising a plurality of spreadsheets, the instance is a version of the spreadsheet workbook associated with a first user;
receiving a modification of an underlying data structure of a spreadsheet, of the plurality of spreadsheets, for the spreadsheet workbook by a second user, the underlying data structure being stored separately from the spreadsheet of the spreadsheet workbook;
initiating a refresh of the version of the spreadsheet workbook based on the receiving of the modification of the underlying data structure of the spreadsheet; and
causing display, in the instance of the spreadsheet workbook, of a graphical notification of the refresh within the spreadsheet indicating that:
the refresh of the version of the spreadsheet workbook has initiated,
the second user initiated the refresh,
the refresh affects a first object of the spreadsheet, and
the refresh affects a second object of the spreadsheet.

17. The computer-readable storage device of claim 16, wherein the causing display of the graphical notification causes one or more graphical notifications to be rendered in the spreadsheet at a first location associated with the first data object and a second location associated with the second data object.

18. The computer-readable storage device of claim 16, wherein the underlying data structure is stored in a second spreadsheet of the spreadsheet workbook.

19. The computer-readable storage device of claim 16, wherein the underlying data structure is stored, in an external database, as a separate document from the spreadsheet workbook.

* * * * *